United States Patent [19]

Giles, Jr.

[11] 4,381,642
[45] May 3, 1983

[54] RAMJET ENGINE

[75] Inventor: Harry L. Giles, Jr., Bellevue, Wash.

[73] Assignee: The Boeing Company, Seattle, Wash.

[21] Appl. No.: 161,246

[22] Filed: Jun. 20, 1980

[51] Int. Cl.³ .............................................. F02K 7/18
[52] U.S. Cl. ...................................... 60/204; 60/245; 60/917
[58] Field of Search ............... 60/270 R, 270 S, 245, 60/244, 204

[56] References Cited

U.S. PATENT DOCUMENTS

| | | | |
|---|---|---|---|
| 3,279,187 | 10/1966 | Lindman | 60/245 |
| 3,807,170 | 4/1974 | Kesting | 60/270 R |
| 4,050,243 | 9/1977 | Holzman | 60/270 S |
| 4,214,442 | 7/1980 | Reingold | 60/270 R |
| 4,277,940 | 7/1981 | Harner et al. | 60/245 |

FOREIGN PATENT DOCUMENTS

| | | | |
|---|---|---|---|
| 590177 | 7/1947 | United Kingdom | 60/245 |
| 1220287 | 1/1971 | United Kingdom | 60/245 |

*Primary Examiner*—Robert E. Garrett
*Attorney, Agent, or Firm*—Thomas H. Murray

[57] ABSTRACT

A ramjet engine for aircraft incorporating means for automatically changing from a subsonic combustion ramjet geometry to a supersonic combustion ramjet geometry. This is accomplished by utilizing solid fuel for the ramjet during the subsonic combustion mode and tailoring the solid fuel such that, as it burns away, the remaining internal engine geometry changes to the internal engine geometry for supersonic combustion. At the desired time, liquid fuel can be injected into the combustion chamber and the ramjet will operate eventually on liquid fuel only as a supersonic combustion ramjet.

5 Claims, 3 Drawing Figures

U.S. Patent  May 3, 1983  4,381,642
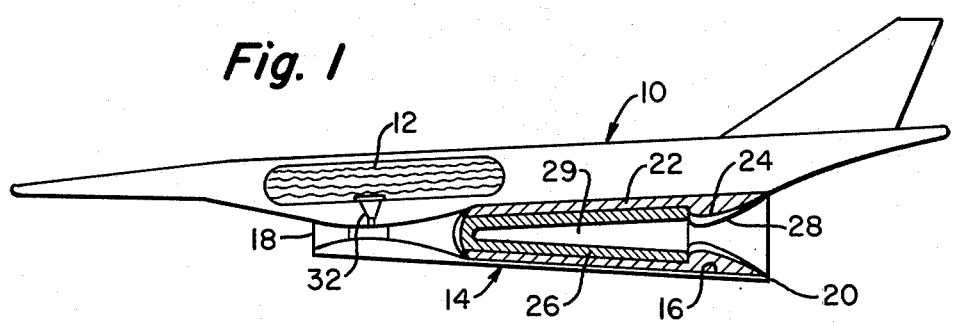
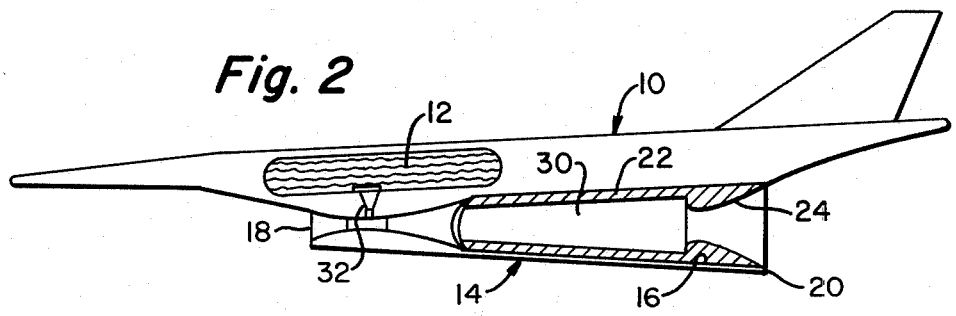
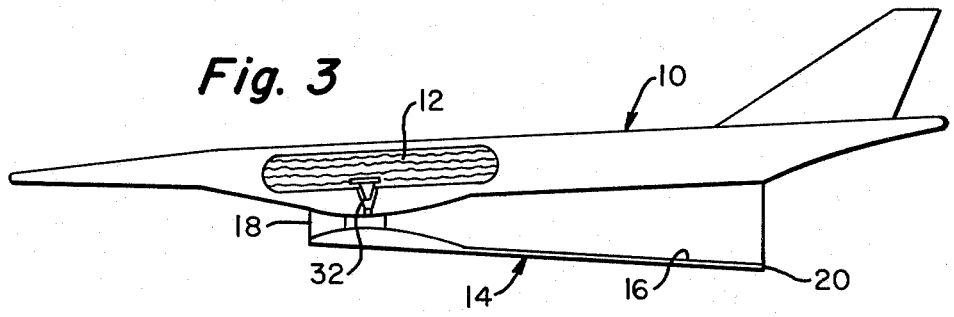

RAMJET ENGINE

BACKGROUND OF THE INVENTION

As is known, there are two fundamental ramjet concepts. These comprise subsonic combustion and supersonic combustion, both of which are applicable to vehicles flying at supersonic speeds. In the subsonic combustion ramjet, the fuel is burned in air which has been slowed down to subsonic speeds within the engine. In a supersonic combustion ramjet, the fuel is burned in air which remains at supersonic velocities throughout the engine. Examples of supersonic combustion ramjet engines are shown, for example, in U.S. Pat. Nos. 3,280,565 and 3,430,445.

A subsonic combustion ramjet operates best at supersonic flight speeds and, therefore, must be boosted to ramjet ignition speed by a first stage, usually a solid rocket. Practical upper flight limits for a subsonic combustion ramjet are usually between 500 and 8000 feet per second. If higher flight speeds are desired with ramjet propulsion, it is necessary to change from a subsonic combustion ramjet to a supersonic combustion ramjet. However, using the same basic ramjet requires effective geometry changes to the engine. Past and current efforts to develop dual-mode (i.e., subsonic-supersonic combustion) ramjets have required complicated mechanical geometry changes and/or complicated fuel injection location control with compromised performance. The major problem is to convert the geometry of the engine from a double-throat to a single-throat configuration.

SUMMARY OF THE INVENTION

In accordance with the present invention, a solid fuel ramjet and liquid fuel supersonic combustion ramjet are combined into an integral propulsion system which does not require any complicated mechanical geometry changes and/or fuel injection location control. Preferably, the engine also incorporates a third propulsion mode, namely a solid rocket, for boosting the vehicle to supersonic speeds prior to initiation of solid fuel ramjet operation.

Specifically, the invention provides a subsonic-supersonic ramjet engine comprising a combustion chamber having an air inlet and an exhaust outlet. A generally cylindrical solid ramjet fuel element is carried on the inner periphery of the combustion chamber and has formed therein a consumable solid fuel nozzle at its aft end, this solid fuel nozzle limiting the gas passing through the interior of the fuel element to subsonic velocities until it is consumed along with the remainder of the fuel element. After the fuel element including the solid fuel nozzle is consumed, a liquid fuel is injected into the combustion chamber and burned with the gases passing through the combustion chamber at supersonic speeds. Ordinarily, and in the preferred embodiment of the invention, the interior of the solid fuel ramjet element is lined with a solid rocket propellant which burns initially, without air passing through the combustion chamber, to bring the vehicle up to supersonic speeds.

The above and other objects and features of the invention will become apparent from the following detailed description taken in connection with the accompanying drawings which form a part of this specification, and which:

FIG. 1 is an illustration of a rocket having the ramjet engine of the invention incorporated therein, the engine being shown as it exists prior to the rocket mode of operation;

FIG. 2 is a view similar to that of FIG. 1 but showing the ramjet engine of the invention when it acts in the subsonic combustion mode of operation; and FIG. 3 is a view similar to FIGS. 1 and 2 showing the engine of the invention when it operates in the supersonic combustion mode of operation.

With reference now to the drawings, and particularly to FIG. 1, there is shown a missile 10 incorporating a tank containing a liquid fuel 12. Beneath the tank is the integral rocket, solid fuel and liquid fuel ramjet engine of the invention, generally indicated by the reference numeral 14. It comprises a flared, generally cylindrical combustion chamber 16 having an air inlet opening 18 and an exhaust opening 20. Carried within the combustion chamber 16 is a generally tubular solid fuel element 22 having at its aft end a ramjet nozzle or restricted orifice 24, also formed from solid fuel. Disposed on the inner periphery of the solid fuel element 22 is a second rocket propellant or fuel element 26 having an ejectable rocket nozzle 28 at its aft end which fits within the solid fuel ramjet nozzle orifice 24. The solid rocket propellant element 26 thus forms a solid rocket combustion chamber 29. Initially, the solid rocket propellant element 26 is ignited with the hot gases resulting therefrom passing out from the combustion chamber 29 through the ejectable rocket nozzle 28 to bring the missile 10 to supersonic speed. During this time, no air flows through the combustion chamber 16 or the rocket combustion chamber 29. After the solid rocket propellant element 26 is consumed, the rocket nozzle 28 is ejected, thereby leaving the configuration shown in FIG. 2. At this stage of operation, air flows through the inlet 18 and through a combustion chamber 30 formed by the solid ramjet fuel element 22. However, because of the restricted orifice formed by the consumable solid fuel ramjet nozzle 24, the gases passing through the combustion chamber 30 do not reach supersonic speeds, notwithstanding the fact that the missile 10 itself is traveling at supersonic speeds. This action continues until the solid fuel element 22 is consumed, whereupon the configuration shown in FIG. 3 results wherein only the outer combustion chamber 16 remains. Fuel is now injected into the combustion chamber 16 from the tank 12 and ignited. At this time, the air passing through the combustion chamber 16 travels at supersonic speeds. The manner in which the fuel is injected into the combustion chamber 16 is unimportant as regards the present invention. It is, however, schematically illustrated as a valve 32 adapted to connect the tank 12 to the air inlet opening 18 leading to the combustion chamber. In actual practice, the fuel tank 12 will be pressurized and the valve will be controlled to permit variations of fuel/air mixtures in the combustor. Furthermore, proper distribution of the fuel may require injectors consisting of small holes spaced along the inlet throat region on both of the side walls and on connecting struts within the airstream itself. The pressurized fuel will be injected through these holes into the airstream followed by downstream mixing and combustion of the fuel/air mixture.

Thus, the sequence of operations involves initial rocket propulsion followed by subsonic combustion of a solid fuel, and finally supersonic combustion of a liquid fuel.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A subsonic-supersonic ramjet engine comprising a combustion chamber having an air inlet and an exhaust outlet, a generally cylindrical solid ramjet fuel element carried on the inner periphery of said combustion chamber and having formed therein a consumable solid fuel nozzle at its aft end, said solid fuel nozzle limiting the gases passing through the interior of the fuel element to subsonic velocities until it is consumed along with the remainder of the fuel element, and means for injecting into said combustion chamber a liquid fuel after the solid fuel element is substantially consumed and gases at supersonic speeds flow through said combustion chamber.

2. The ramjet engine of claim 1 including a lining of rocket fuel on the inner periphery of said solid ramjet fuel element, and an ejectable nozzle for said rocket fuel carried within said consumable solid fuel nozzle.

3. The ramjet engine of claim 2 including means for preventing the flow of air through said combustion chamber as said rocket fuel element burns.

4. A method for accelerating at supersonic speed a missile containing a quantity of liquid fuel for use in a ramjet attached to said missile, said method comprising the steps of providing a ramjet comprising a combustion chamber having an air inlet and an exhaust outlet and having upon the interior periphery of said combustion chamber a generally cylindrical element of consumable solid fuel having formed therein at the aft end of said combustion chamber a nozzle means, said ramjet also having means for injecting said liquid fuel into said ramjet, initially burning said element while operating said ramjet as a subsonic combustion ramjet and eroding and consuming said nozzle means, then subsequently, after said element and nozzle means have been consumed, injecting and burning said liquid fuel while operating said ramjet as a supersonic combustion ramjet.

5. A method as defined in claim 4 for accelerating to and at supersonic speed a missile containing a quantity of liquid fuel for use in a ramjet attached to said missile, said method comprising the steps of providing a ramjet as defined in claim 4, said ramjet further comprising (a) on the interior periphery of said element of consumable solid fuel a lining of solid rocket fuel and (b) an ejectable fuel nozzle for use with said rocket fuel, initially consuming said rocket fuel to accelerate said missile to supersonic speed, ejecting said fuel nozzle, then burning said element while operating said ramjet as a subsonic combustion ramjet and eroding and consuming nozzle means, then subsequently, after said element and nozzle means have been consumed, injecting and burning said liquid fuel while operating said ramjet as a supersonic combustion ramjet.

* * * * *